UNITED STATES PATENT OFFICE.

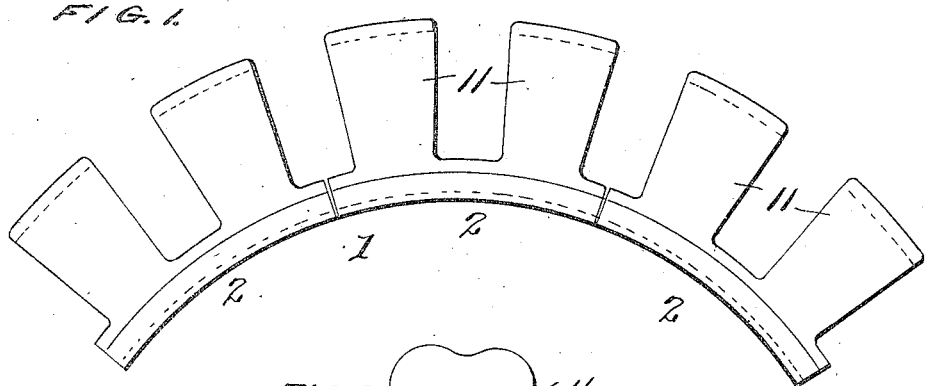
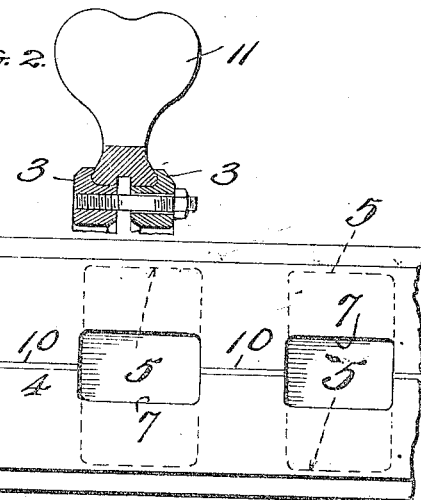
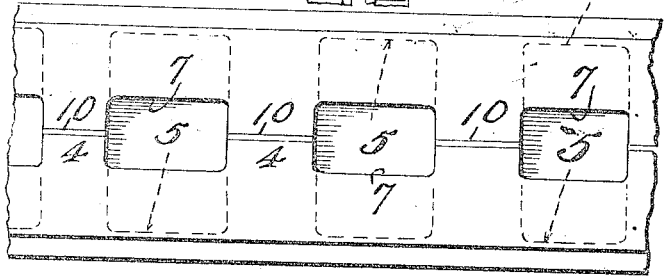
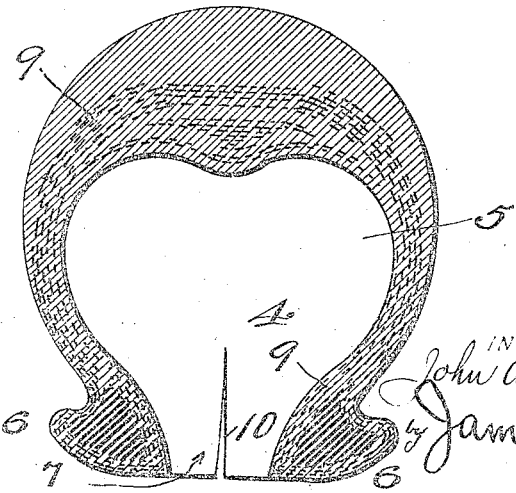

JOHN A. MacMILLAN, OF DAYTON, OHIO.

PROCESS OF MAKING CUSHION VEHICLE-TIRES.

966,031.

Specification of Letters Patent. Patented Aug. 2, 1910.

Application filed April 26, 1909. Serial No. 492,150.

*To all whom it may concern:*

Be it known that I, JOHN A. MACMILLAN, a citizen of the United States, and resident of the city of Dayton, in the county of Montgomery and State of Ohio, have invented certain new and useful Improvements in Processes for Making Cushion Vehicle-Tires, of which the following is a specification.

The present invention relates to a process for making cushion vehicle tires.

In carrying out my process, I prefer to use an annular former upon which are circumferentially arranged and placed at intervals, a number of sectional pieces attached to a holding device. These sectional pieces are attached preferably to segmental separable bases of annular form. The masses of resilient material such as rubber are placed between the radially circumferential sectional pieces. Over these alternately interspaced masses of rubber and sectional pieces are formed strips of fabric and rubber which are circumferentially placed over and around said masses and sectional pieces and the tire built up after the manner of tire casings or shoes of pneumatic tires.

In the drawings Figure 1 represents a side elevation of a portion of an annular former having, preferably at regular intervals, transverse circumferentially arranged sectional pieces. Fig. 2 is a detail transverse elevation and section of one of the sectional pieces of the annular former. Fig. 3 is a cross section of the tire. Fig. 4 is a plan of a portion of the interior face of one of the tires.

One method of carrying out my improved process consists in placing masses of rubber within the spaces between the sectional pieces so as to bridge at intervals the transverse diameter of the completed tire, and thereby form interspaced columns; and then to build up the outer casing or shoe (including the beads, if a clencher rim is desired) by successively placing longitudinally over the masses of rubber and the sectional pieces, strips of rubber and fabric until the tire is built up into the final desired shape and form. The masses of rubber and the circumferential strips of rubber and fabric are generally adhesive and are molded into one compact form before vulcanizing. After the tire is completely molded and formed, it is vulcanized. After vulcanization, owing to the flexibility of the tire, the segmental sectional pieces are preferably removed by being pulled out of the tire inwardly and radially. It should be understood that a hollow cellular space is produced by each one of the transverse segmental sectional pieces of the former, the first step of the process producing a core of cellular resilient material.

The transverse sections of the tire are preferably perforated or slitted as shown, and are generally formed of undercured rubber which, after vulcanization, becomes practically homogeneous with the rest of the tire fabric.

In the drawings 1 represents the former; 2, the segmental sectional pieces of the former; 3, the holding rings; 4, transverse bridges or columns; 5, cellular spaces between the columns; 6, the clencher rim; 7, open spaces in the base of the clencher rim interrupted by columns 5; 8, the tire tread; 9, strips of fabric and rubber forming the outer circumferential casing; 10, slits in the columns 5, and 11, the sectional pieces on the segmental sections 2 of the former 1.

I claim:

1. The process of making tires, which consists in first placing resilient material in the form of a cellular core upon a sectional former detachable from the completed core, then building up over such formed core a tread structure of strips of fabric and resilient material, then placing a mold over the core and strips, then vulcanizing the tire, and finally removing the sectional former.

2. The process of making tires which consists in first placing at intervals resilient material transversely of the core upon a sectional former detachable from the completed core, then building up over such formed core a tread structure of strips of fabric and resilient material, then placing a mold over the core and strips, then vulcanizing the tire, and finally removing the sectional former.

3. The process of making tires which consists in first placing columns of rubber separably upon a sectional former, then building up over such columns a tread structure of strips of fabric and rubber over and connecting the columns, then placing a mold over the fabric and rubber, then vulcanizing the whole, and finally removing the sectional former.

4. The process of making tires, which consists in first slitting columns of rubber, then placing such columns separably upon a sectional former, then building up over such columns a tread structure of strips of fabric and rubber over and connecting the columns, then placing a mold over the fabric and rubber, then vulcanizing the whole, and finally removing the sectional former.

JOHN A. MacMILLAN.

Witnesses:
K. H. FINCH,
WALTER T. ELLIOTT.